United States Patent [19]

Hamma

[11] 4,216,656
[45] Aug. 12, 1980

[54] HIGH-EFFICIENCY HYDROSTATIC VEHICULAR DRIVE SYSTEM

[75] Inventor: Karlmann Hamma, Tettnang, Fed. Rep. of Germany

[73] Assignee: Zahnradfabrik Friedrichshafen AG, Friedrichshafen, Fed. Rep. of Germany

[21] Appl. No.: 50,959

[22] Filed: Jun. 22, 1979

[30] Foreign Application Priority Data

Jun. 24, 1978 [DE] Fed. Rep. of Germany ....... 2827810

[51] Int. Cl.$^2$ .......................................... F16H 39/46
[52] U.S. Cl. ...................................... 60/445; 60/447; 60/452
[58] Field of Search ................ 60/445, 447, 452, 488, 60/368

[56] References Cited

U.S. PATENT DOCUMENTS

| | | | |
|---|---|---|---|
| 2,238,060 | 4/1941 | Kendrick | 60/452 |
| 3,444,689 | 5/1969 | Budzich | 60/445 X |

OTHER PUBLICATIONS

ZF–Controls for Hydrostatic Transmissions, Technical Report 1/73, Bruening Hydraulik GmbH.
Brueninghaus Hydraulik GmbH, B60K 17$^{70}$ A8, Publ. Aug. 1972 Technischer Bericht 1/73, Hydrostatische Antriebe.

*Primary Examiner*—Edgar W. Geoghegan
*Attorney, Agent, or Firm*—Karl F. Ross

[57] ABSTRACT

A drive system has an engine that operates a control pump and a hydraulic variable-displacement drive pump having a control element and connected to a hydraulic motor. A servocylinder operates the control element of the drive pump and is pressurized through a control line connected to the control-pump output. A control valve is connected between the control line and the sump of the system and is connected to the hydraulic line between the motor and the drive pump to reduce pressure in the control line when the higher pressure of the line between the drive pump and the motor rises within a predetermined range. Thus it is possible with a substantially constant engine speed to produce a substantially constant output torque, with only the displacement of the pump and pressure in the lines between the pump and the motor varying by appropriate control of the control-line pressure.

10 Claims, 4 Drawing Figures

HIGH-EFFICIENCY HYDROSTATIC VEHICULAR DRIVE SYSTEM

FIELD OF THE INVENTION

The present invention relates to a hydrostatic drive system. More particularly this invention concerns a steplessly adjustable hydrostatic drive system of the type used in construction equipment or in a fork lift.

BACKGROUND OF THE INVENTION

A hydrostatic drive is known which comprises a variable-displacement pump permanently connected to the output shaft of an internal-combustion engine and connected via a pair of conduits to a hydraulic motor whose output in turn serves to power the vehicle. Normally such an arrangement is used to displace the vehicle along the ground and also to operate the various peripheral equipment of the vehicle.

The variable-displacement pump is normally constituted as an axial-piston pump and the control element is the swash plate thereof. In a neutral position of this swash plate, that is perpendicular to the rotation axis, the pump, even though driven, does not displace any fluid. When tipped to one side of this position the motor connected to this pump will be driven in one direction, and when tipped to the other side of this position the motor will be driven in the opposite direction. Thus such a system allows a diesel engine which only operates at peak efficiency in a so-called nominal range to be used to drive a shaft in either direction at any of a multiplicity of speeds. The engine is simply set to operate at its nominal speed and the steplessly variable transmission couples it to the output.

Normally a servomechanism, typically formed as a double-acting hydraulic cylinder, is employed to displace the control element. In such a system a so-called control pump is connected to the engine along with the variable-displacement pump, so that when the control element of the variable-displacement pump is in the neutral position this control pump will be able to produce a high pressure suitable for operating the servocylinder. Typically a four-port three-position reversing valve is provided connected on one side to the two chambers of the double-acting cylinder and on the other side to the high-pressure side of the control pump and to the sump. Thus displacement of this valve into one end position will displace the control element in one direction from the neutral position and displacement in the opposite direction will displace the control element similarly oppositely.

It has further been suggested in Technical Report 1/73 of BRUENING HYDRAULIK GmbH entitled "HYDROSTATISCHE ANTRIEBE" to automatically limit the pressure in the system with increasing operation speed. Such a system prevents a predetermined maximum torque limit from being exceeded. Nonetheless this system has the considerable disadvantage that the drive engine is slowed down somewhat at all speeds, with the amount of wasteful slowing down being greatest at the higher output levels for the drive system.

It has further been suggested from the report "ZF-CONTROLS FOR HYDROSTATIC TRANSMISSIONS" of Zahnradfabrik Friedrichshafen AG (F 11/6 ZFF 77304) to reduce the effect of the control pressure on the control piston of the regulating device by a force proportional to the working pressure, in conjunction with a corresponding reduction of the drive engine's RPM. Thus in the nominal or central drive pressures the reduction in RPM is at a maximum whereas in a condition wherein, for instance, the vehicle is pushing an immovable object, it is possible to operate with maximum working pressure. Such a system, therefore, also slows down the drive engine at the critical intermediate range, wasting valuable energy.

OBJECTS OF THE INVENTION

It is therefore an object of the present invention to provide an improved hydrostatic drive system.

Another object is to provide such a drive system wherein the engine is operated most efficiently in the critical intermediate range of the drive engine.

SUMMARY OF THE INVENTION

These objects are attained according to the instant invention in a drive system having a hydraulic variable-displaceable drive pump coupled to and driven by the engine and having a control element displaceable from a null position corresponding generally to zero pump displacement into an end position corresponding generally to maximum pump displacement. The hydraulic motor operating against the load is connected to this drive pump. Means is provided including at least one hydraulic feed line interconnecting the drive pump and the motor for driving this motor at a speed generally proportional to the displacement of the drive pump, which in turn is determined by the position of the control element, and for pressurizing the feed line at a pressure related to the load. Control means is connected to this feed line and urges the control element into its end position with a relatively large force when the feed-line pressure lies above and below a predetermined range and urges the control element into its end position with a relatively small force when the feed line pressure lies within this range.

Thus with the system according to the instant invention it is possible for the output of the arrangement to exert a substantially constant torque or force on the load while the internal-combustion engine's speed remains also substantially constant. The pump displacement and pressure in the system meanwhile vary. Thus it is possible to operate the engine at its most efficient speed, while producing the desired constant output torque.

According to further features of this invention the control means includes a control pump coupled to and driven by the engine and having a control-pump output whose pressure is generally proportional to engine speed. A servocylinder is connected to the control element and is connected via a control line to the control-pump output for pressurization of this servocylinder with the control-line pressure. A control valve is connected to the feed line and is connected between the control line and a sump for bleeding the control line into the sump when the feed-line pressure is within the range and for isolating it from the sump when the feed-line pressure is without the range. Thus in the critical intermediate operating range the control-line pressure is reduced so that the drive system can produce a constant output torque with a constant engine speed.

According to further features of this invention the control valve comprises a valve housing formed with an axially extending valve chamber and axially offset feed, control, and sump ports respectively connected to the feed line, the control line, and the sump. A valve body subdivides this valve chamber into respective feed, control, and sump compartments and is formed generally at the control and sump compartments without a cutout. The feed compartment is substantially only connected to the feed line so as to be at the feed-line pressure. In addition the valve body is displaceable between a pair of end positions blocking fluid flow between the control and sump compartments and corresponding to feed-line pressure above and below the predetermined range and into central positions permitting fluid flow between the control and sump compartments and corresponding to feed-line pressures within the predetermined range. A spring urges the valve body into that end position corresponding to feed-line pressures below the range.

Thus a purely hydraulic control system can serve to carry out the functions described above. It would of course be possible to use electrical or other servosystems to achieve these ends, but the use of a wholly hydraulic system is advantageous in a piece of equipment which has various other hydraulic peripheral systems.

SPECIFIC DESCRIPTION

Figure 1:
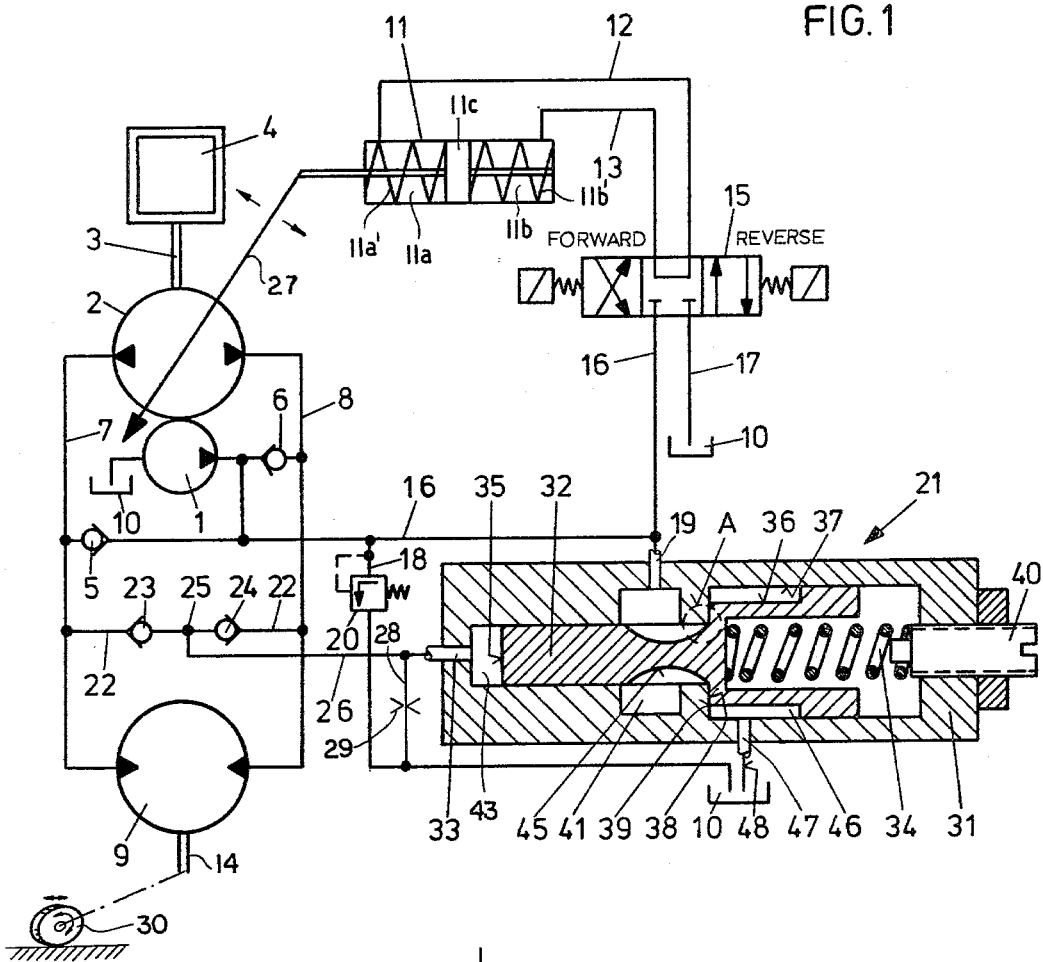
FIG. 1 is a largely schematic view of the system according to the instant invention with the valve shown in axial section and in one end position.

As shown in FIG. 1 a drive system usable in a fork lift, piece of construction equipment, or the like has an internal-combustion engine 4, normally of diesel type, connected via an engine shaft 3 to a reversible variable-displacement main drive pump 2, normally of the axial-piston type having a control element 27 constituted as a swash plate, and to a smaller control pump 1. The two pumps 1 and 2 are operated continuously by the output shaft 3 of the engine 1, but the control element 27 can be set so that no pumping action takes place in the reversible pump 2. A pair of hydraulic lines 7 and 8 connect the pump 2 to a main drive motor 9 connected via a shaft 14 to a load 30 here constituted as a ground-engaging drive wheel. The motor 9 is reversible, so that when the pump 2 is reversed the wheel 30 can be reversed also. The pump 1 has an intake side connected to a sump or reservoir 10 and an output side connected via check valves 5 and 6 to the lines 7 and 8. In addition the output of the pump 1 is connected to a control line 16 in turn connected via a shunt line 18 and a pressure-limiting valve 20 to the sump 10. Thus the pump 1 will pressurize the lines 7 and 8 to compensate for pressure losses therein, and will normally maintain the pressure in the lines 7 and 8 at or below the pressure set by the pressure-limiting valve 20 as will be described below.

The swash plate or control element 27 can be moved from its indicated null position in either direction by means of a double-acting servocylinder 11 having a pair of compartments 11a and 11b provided with respective springs 11a' and 11b' flanking a piston 11c. These compartments 11a and 11b are connected via respective hydraulic lines 12 and 13 to a four-port three-position reversing valve 15 having another side connected to the line 16 and to a drain line 17 running to the sump 10.

In accordance with the instant invention a control valve 21 has a housing 31 subdivided by a valve body 32 into a feed compartment 43, a control compartment 41, and a sump compartment 46. The two hydraulic feed lines 7 and 8 are connected via hydraulic lines 22 and respective check valves 23 and 24 to a tee 25 connected in turn through another hydraulic line 26 to a feed port 33 opening into the compartment 43. A bypass line 28 provided with a restriction 29 is connected between the line 26 and the sump 10. This restriction 29 is extremely small and may, in fact, be eliminated, with leakage between the valve body 32 and housing 31 taking its place. The compartment 41 is connected via a port 19 with the control line 16 and the compartment 36 is connected via a port 47 and a line 48 with the sump 10.

This valve body 32 has one end face 35 exposed in the compartment 43 to the pressure in the line 26, which is equal to the pressure of line 7 or 8, whichever is higher. At its opposite end the valve body 32 has a widened portion 36 received in a widened portion 37 of the housing 31 and bearing on one end of a compression spring 34 whose opposite end bears on an adjustment screw 40. Thus the force of the spring 34 is effective in a direction exactly opposite the effective direction of the pressure in the compartment 43. In addition the valve housing 31 has a shoulder 38 which can engage flatly against a corresponding shoulder 39 of the valve body 32. Finally immediately starting from this shoulder 38 the valve body is formed with at least one axially elongated cutout 45 which tapers uniformly and in axially opposite directions away from its center.

When the system is completely depressurized and inoperative, or when for some reason it is under extremely low operating pressure, the parts of the system will assume the position shown in FIG. 1. In this position the shoulders 38 and 39 will bear flatly against each other at the region indicated as A so that no flow will be possible from the control line 16 through the valve 21 to the sump 10.

Figure 3:
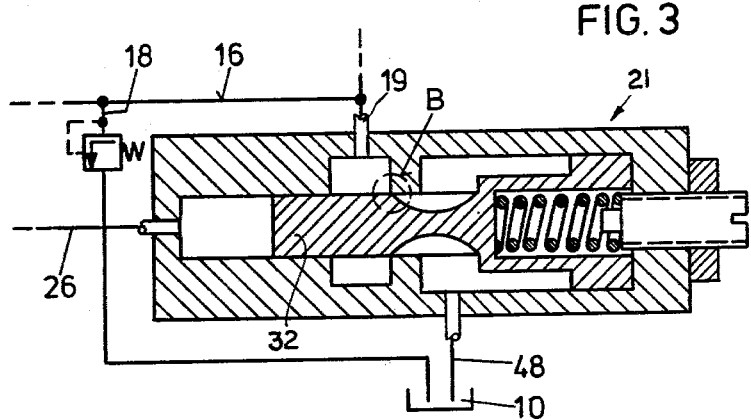

When the system is started up, with the swash plate 27 in its null position, the pressure in line 26 will rise to a rather high level very rapidly, so as to push the valve body 32 toward the right into the position shown in FIG. 3, in which position the portion indicated as B of the valve body 32 will again prevent liquid communication between the line 16 and sump 10 through the valve 21.

Figure 2:
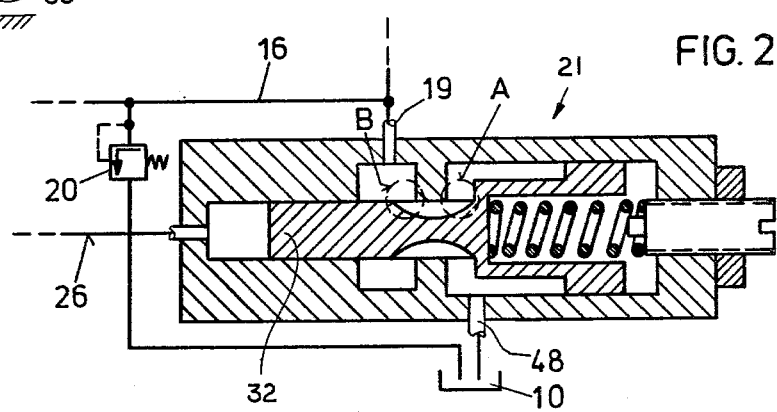
FIGS. 2 and 3 are axial sections through the valve in an intermediate and the opposite end position, respectively.

In the intermediate position shown in FIG. 2, however, the regions A and B are open so that flow from the control line 16 to the sump 10 is possible.

Figure 4:
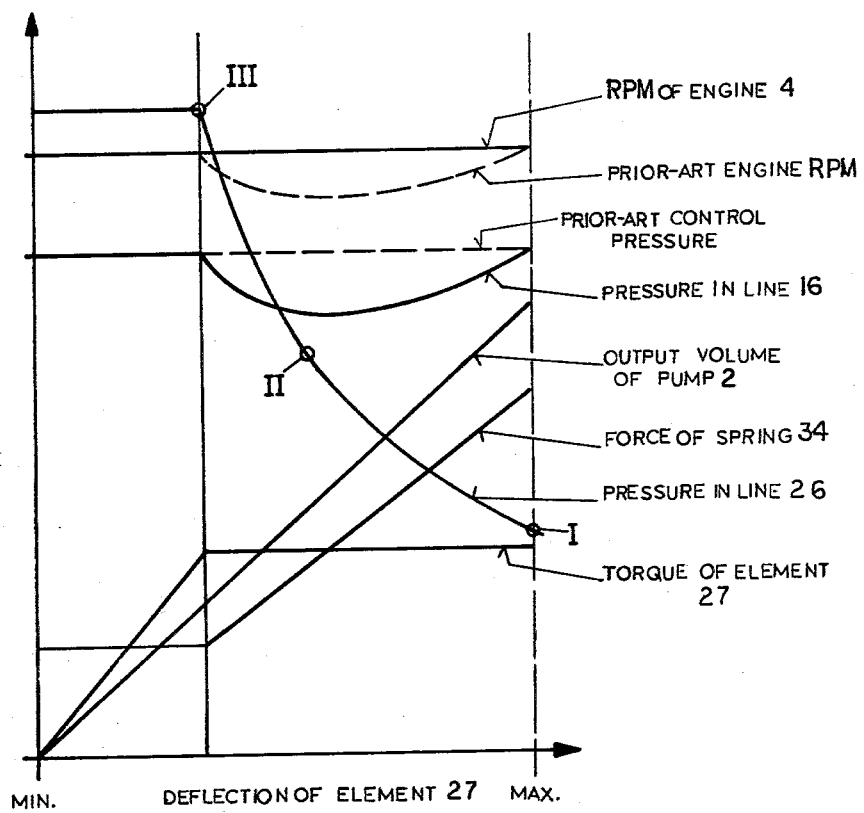
FIG. 4 is a graph illustrating the operation of the system according to this invention.

The above-described positions of FIGS. 1, 2 and 3 correspond to those positions indicated at locations I, II and III, respectively, in FIG. 4. Thus it is apparent that given a constant engine RPM the valve will be in the position of FIG. 3 during an inching range for the first portion of deflection of the element 27. Once the valve 21 starts to open, however, the control pressure, that is the pressure in line 16, will drop, with the valve 21 assuming the position of FIG. 2. Meanwhile the output volume of pump 2 will rise uniformly, and the force of spring 34 will also increase uniformly as it is compressed. The dropping pressure in line 26 and the increasing output volume of pump 2 therefore produce a substantially constant torque at the shaft 14.

Finally when the pressure in line 26 drops to a relatively low level, the force of spring 34 will be sufficient to overcome and close the valve 21 as indicated at location I. Meanwhile the steadily decreasing cross-sectional area of the passage created through the circumferential outwardly open cutout 45 will be slowly increasing the pressure in line 16.

The graph in FIG. 4 also shows in dashed lines how in a prior-art system wherein the control pressure remains almost perfectly constant the engine RPM normally drops off in the central region. Obviously a sensitive engine having a small nominal range, that is an RPM range at which it operates efficiently, will operate relatively inefficiently during this intermediate control region.

The system does not normally operate above the range between the points I and III in FIG. 4. Nonetheless with the instant system the engine RPM will remain almost perfectly constant as will the torque output of the drive system. Such operational characteristics ensure extremely good energy efficiency.

I claim:

1. A drive system comprising:
   an engine;
   a hydraulic variable-displacement drive pump coupled to and driven by said engine and having a control element displaceable from a null position corresponding generally to zero pump displacement into an end position corresponding generally to maximum pump displacement;
   a hydraulic motor operating against a load;
   means including at least one hydraulic feed line interconnecting said drive pump and said motor for driving said motor at a speed generally proportional to the displacement of said drive pump and for pressurizing said feed line at a feed-line pressure related to said load; and
   control means connected to said feed line and to said control element for urging said control element into said end position with a relatively large force when said feed-line pressure lies above and below a predetermined range, and for urging said control element into said end position with a relatively small force when said feed-line pressure lies within said range.

2. The system defined in claim 1 wherein said control means includes:
   a control pump coupled to and driven by said engine and having a control-pump output whose pressure is generally proportional to engine speed;
   a servocylinder connected to said control element;
   conduit means including a control line connected between said control-pump output and said servocylinder for pressurizing same with the control-line pressure;
   a sump; and
   a control valve connected to said feed line and connected between said control line and said sump for bleeding said control line into said sump when said feed-line pressure is within said range and for isolating said control line from said sump when said feed-line pressure lies without said range.

3. The system defined in claim 2 wherein said servocylinder has a cylinder defining a servochamber, and a piston displaceable in said chamber and connected to said control element, said control line opening into said chamber.

4. The system defined in claim 2 wherein said drive pump is reversible and said control element is displaceable from said null position into two such end positions corresponding to respective opposite senses of rotation of said motor.

5. The system defined in claim 2 wherein said control valve comprises:
   a valve housing formed with an axially extending valve chamber and with axially offset feed, control and sump ports respectively connected to said feed line, said control line, and said sump;
   a valve body in said valve chamber subdividing same into respective feed, control, and sump compartments and formed generally at said control and sump compartments with a cutout, said feed compartment being substantially only connected to said feed line so as to be at said feed-line pressure, said valve body being displaceable between a pair of end positions blocking fluid flow between said control and sump compartments and corresponding to feed-line pressures above and below said predetermined range, and into central positions permitting fluid flow between said control and sump compartments and corresponding to feed-line pressures within said predetermined range; and
   a spring urging said valve body into the respective end position corresponding to feed-line pressures below said range.

6. The system defined in claim 5 wherein said cutout is constructed and adapted to provide a generally constant force applied to said load with a generally constant engine speed and varying displacements and pressures.

7. The system defined in claim 5 wherein said cutout is of a cross-sectional size tapering uniformly axially in both directions, whereby the amount of fluid flow between said control and sump compartments increases and decreases uniformly as said valve body moves between said end positions.

8. The system defined in claim 5, further comprising a pressure-limiting valve connected between said control line and said sump.

9. The system defined in claim 5 wherein said servocylinder is double-acting and has a pair of servocompartments and a piston therebetween and connected to said control element, said control means including a reversing valve having one side connected to said sump and to said control line and another side with two parts respectively connected to said servocompartments.

10. The system defined in claim 1 wherein said engine is an internal-combustion engine.

* * * * *